(12) United States Patent
Stern et al.

(10) Patent No.: US 7,191,338 B2
(45) Date of Patent: Mar. 13, 2007

(54) SECURE METHOD FOR PROVIDING PRIVATELY VIEWABLE DATA IN A PUBLICLY VIEWABLE DISPLAY

(75) Inventors: Edith H. Stern, Yorktown Heights, NY (US); Barry E. Willner, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 834 days.

(21) Appl. No.: 10/335,019

(22) Filed: Dec. 31, 2002

(65) Prior Publication Data

US 2003/0133569 A1  Jul. 17, 2003

Related U.S. Application Data

(63) Continuation-in-part of application No. 09/481,897, filed on Jan. 12, 2000, now Pat. No. 6,529,209.

(51) Int. Cl.
*G01L 5/06* (2006.01)
*G09G 5/00* (2006.01)

(52) U.S. Cl. .............................. 713/183; 345/4; 345/7
(58) Field of Classification Search ............... 380/206; 713/161
See application file for complete search history.

(56) References Cited

U.S. PATENT DOCUMENTS

| | | | |
|---|---|---|---|
| 5,510,832 A | 4/1996 | Garcia | 348/56 |
| 5,614,920 A * | 3/1997 | Coteus et al. | 345/7 |
| 5,629,984 A | 5/1997 | McManis | 380/54 |
| 5,781,723 A * | 7/1998 | Yee et al. | 726/20 |
| 5,953,054 A * | 9/1999 | Mercier | 348/50 |
| 5,956,001 A * | 9/1999 | Sumida et al. | 345/55 |
| 5,963,371 A | 10/1999 | Needham et al. | 359/464 |
| 6,240,184 B1 * | 5/2001 | Huynh et al. | 380/206 |
| 6,529,209 B1 * | 3/2003 | Dunn et al. | 345/629 |
| 6,552,850 B1 * | 4/2003 | Dudasik | 359/501 |

(Continued)

FOREIGN PATENT DOCUMENTS

JP        06-110403        4/1994

(Continued)

OTHER PUBLICATIONS

*Encryption Algorithms*, <http://www.networksorcery.com/enp/data/encryption.htm>, (viewed Dec. 27, 2002).

*Primary Examiner*—Nasser Moazzami
*Assistant Examiner*—Pramila Parthasarathy
(74) *Attorney, Agent, or Firm*—Akerman Senterfitt

(57) ABSTRACT

A method for securely providing privately viewable data in a publicly viewable display can include interspersing private data frames among public data frames according to a sequencing pattern. A syncstream can be encoded based upon a syncstream mask. More particularly, the syncstream can specify when to activate shutters in a set of active glasses in synchronization with the sequencing pattern. Notably, an encryption key pair can be generated having a public key and a private key. Using the public key, the syncstream mask can be encrypted and forwarded to a pair of active glasses. Once received in the active glasses, the encrypted syncstream mask can be decrypted with the private key. Finally, the decrypted syncstream mask can be applied to the encoded syncstream to determine when to activate the shutters in the active glasses.

18 Claims, 10 Drawing Sheets

U.S. PATENT DOCUMENTS 6,597,328 B1 * 7/2003 Stern et al. .................... 345/9
6,959,389 B1 * 10/2005 Dunn et al. ................. 713/183

FOREIGN PATENT DOCUMENTS

| JP | 06-118927 | 4/1994 |
| JP | 07-084555 | 3/1995 |
| JP | 09-050328 | 2/1997 |
| JP | 11-024580 | 1/1999 |

* cited by examiner

INITIAL SYNCHRONIZATION PATTERN

DATA TRANSMISSION PATTERN

SECURE METHOD FOR PROVIDING PRIVATELY VIEWABLE DATA IN A PUBLICLY VIEWABLE DISPLAY

CROSS REFERENCE TO RELATED APPLICATIONS

This patent application is a continuation-in-part of U.S. patent application. Ser. No. 09/481,897 entitled METHOD FOR PROVIDING PRIVATELY VIEWABLE DATA IN A PUBLICALLY VIEWABLE DISPLAY filed on Jan. 12, 2000 now U.S. Pat No. 6,529,209.

BACKGROUND OF THE INVENTION

1. Technical Field

This invention relates to the field of computer imagery and more particularly to a system and method for providing privately viewable data in a publicly viewable display.

2. Description of the Related Art

The laptop computer has become a ubiquitous part of current computer technology. Laptops by their nature are used on trains, in airplanes, and in most public places. Still, portable computing carries with it a substantial disadvantage. Specifically, in a crowded environment, what is visible on the display screen of a laptop remains visible to all within viewing distance of the display screen. Thus, from the perspective of the laptop user, a potential security concern exists which can undermine the usefulness of the laptop. Exemplary cases include the use of laptop computers on airplanes where the seating and tray table arrangements are so close that the adjacent passengers can easily view one another's laptop screens. A similar situation exists in airport lounges, waiting rooms, etc.

Similar non-laptop security and privacy issues can arise in other environments. For example, in a high security environment, desktop machines are typically housed in separate rooms or cubicles to prevent adjacent workers from viewing each others screens. Additionally, Automatic Teller Machines (ATMs) are readily available, but almost always ATMs are placed in conspicuous locations for ease of use. The conspicuous nature of the chosen public location can contribute to the ease of observation, which can permit an unauthorized viewer to obtain an ATM user's confidential information as the user inserts their ATM card into the ATM and subsequently keys in a Personal Identification Number (PIN). Hence, it would be advantageous if a user could be provided with a private view of a publicly viewable display screen while unauthorized viewers are provided with a different, public view of the same display screen.

Presently, techniques exist for rendering different images on a single display screen. Three-dimensional (3D) imaging represents the most well known example. 3D imaging involves presenting different images to each eye, allowing the human vision system to integrate each into one composite image. 3D imaging techniques can be implemented using various technologies, such as color filters or shutters. The display screen can include different images presented in an alternating fashion. The viewers eyes, using the visual persistence of the retina and the visual cortex, can integrate the alternating images into a unified image.

U.S. patent application. Ser. No. 09/481,897 entitled METHOD FOR PROVIDING PRIVATELY VIEWABLE DATA IN A PUBLICALLY VIEWABLE DISPLAY relates to the rendering of private data in a publicly viewable display in a manner so that only an authorized viewer can view the private data. Unauthorized viewers, by comparison, can view only publicly viewable "masking data", such as a screen saver, mere random patterns, or unreadable imagery. In furtherance of this purpose, imaging techniques including data hiding and alternating patterns, are combined with a wearable device, for example active glasses, synchronized with a display incorporating images produced by the imaging techniques. Applying the known capability of the human vision system to fuse dissimilar images into a single image, the privately viewable data can be viewed in the publicly viewable display by one wearing the active glasses.

As a particular example, with active glasses multiple visuals can be perceived using alternating imagery. Active glasses can be combined with a display controller for controlling the rate of alternating each displayed image. Advantageously, the presentation through the active glasses of private imagery interspersed among masking imagery can be programmed to match a sequencing rate used to sequentially intersperse the private imagery among the masking imagery in the display screen. Using the sequencing rate, which can be provided to an authorized viewer, but not an unauthorized viewer, it is possible to prevent the unauthorized viewers from perceiving the private imagery being displayed because without active glasses programmed to the sequencing rate, the private imagery cannot be visually extracted from the interspersed masking imagery.

To coordinate the action of the shutters of the active glasses with the interspersal of the private data among public data frames, the sequencing rate must be known both to the active glasses and the display screen. While ordinarily the mere electronic communication of the sequencing rate between glasses and display screen can suffice, for more secure applications, such as in the case of the viewing of highly confidential materials, or at an ATM, a more secure method will be required. Accordingly, there remains a long felt, but unsolved need for a secure method for providing privately viewable data in a publicly viewable display.

SUMMARY OF THE INVENTION

A method for securely providing privately viewable data in a publicly viewable display can include interspersing private data frames among public data frames according to a sequencing pattern. A digital signal for synchronizing one or more computing entities in a computing system (hereinafter "syncstream") can be encoded based upon a mask (hereinafter "syncstream mask"). More particularly, the syncstream can specify when to activate shutters in a set of active glasses in synchronization with a sequencing pattern. Notably, an encryption key pair can be generated having a public key and a private key. Using the public key, the syncstream mask can be encrypted and forwarded to a pair of active glasses. Once received in the active glasses, the encrypted syncstream mask can be decrypted with the private key. Finally, the decrypted syncstream mask can be applied to the encoded syncstream to determine when to activate the shutters in the active glasses.

A system for securely providing privately viewable data in a publicly viewable display can include a transmitter/receiver coupled to the publicly viewable display configured to transmit syncstream data to proximately positioned active glasses, and to receive commands and data from the active glasses. A syncstream generator can be included and can be configured to produce a syncstream based upon a sequencing pattern defining when to display private data frames among a series of public data frames in the publicly viewable display. Additionally, a syncstream mask encoder can be coupled to the syncstream generator and configured to encode the syncstream based upon a syncstream mask. Finally, an encryption processor can be coupled to the syncstream mask encoder and configured to encrypt the syncstream mask for transmission to respective ones of the active glasses according to encryption key data provided by the respective ones of the active glasses through the transmitter/receiver.

Importantly, any portion of, any one of or all of the syncstream generator, syncstream mask encoder and encryption processor can be disposed in a pluggable card for use in a modular system. Examples of pluggable cards include modular cards configured for use in a computing system backplane. As an alternative, any portion of, any one of or all the syncstream generator, syncstream mask encoder and encryption processor can be incorporated as part of an operating system, for instance as part of the presentation layer of an operating system, or as a display device driver in the operating system. Finally, any portion of, any one of or all the syncstream generator, syncstream mask encoder and encryption processor can be incorporated in an application executing on top of the operating system.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention, described herein, includes a system, method, and apparatus that taken together, provide a secure private view of publicly viewable data using visual data hiding. A basic system, in accordance with the inventive arrangements, can include a set of active glasses, a computer, a data communications link from the active glasses to a computer, encoding software contained within the computer, and a substitute display driver in the computer used by the encoding software in lieu of a standard display driver. The system further can include a secure syncstream transmission module in which masking data for an actual syncstream can be securely communicated between the computer and the active glasses without risk of the unauthorized interception of the masking data.

Figure 1:
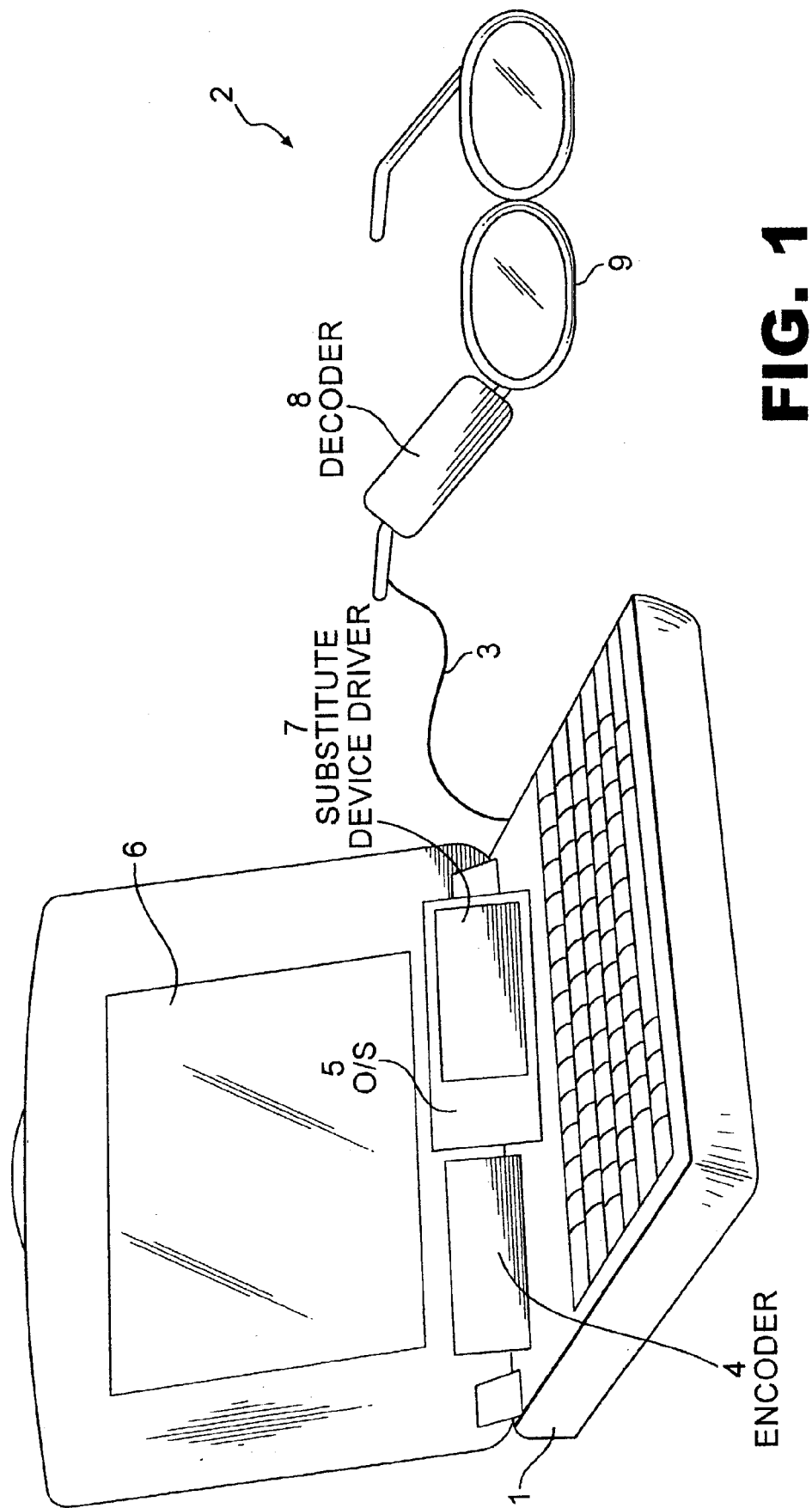
FIG. 1 is a diagramatic illustration of a laptop computer and a pair of active glasses, configured for use with the present invention.

FIG. 1 is a high level diagram of a laptop computer in accordance with the inventive arrangements. The system can include a laptop computer 1 having a display 6, a set of active glasses 2 having therein shutters 9, and a communications link 3 connecting the computer 1 to the active glasses 2. Although FIG. 1 indicates a wire-based communications link, the invention is not limited in this regard. Rather, communications link 3 can include wireless solutions as well, for example an RF link such as Bluetooth or 802.11×, or an infrared link.

The computer 1 can further include therein stored in a computer readable memory, an operating system 5, a substitute display device driver 7 and an encoder application 4. The substitute display device driver 7 can replace the standard original equipment manufacturer (OEM) device driver, typically used to communicate with video circuitry (not shown) in order to display video output in the display 6. More particularly, the substitute display device driver 7 can provide the video output to the display 6 and the active glasses 2 in a manner consistent with the inventive arrangements. Finally, the encoder 4 can execute as a stand-alone application program on the computer 1.

The encoder 4 can encode video output from other executing applications and, if requested by a user of the computer 1, can transmit the encoded video output to the display 6 and a corresponding sync signal to the active glasses 2 in accordance with the inventive arrangements. Correspondingly, a decoder 8, included with the active glasses 2 can decode the sync signal received from the computer 1 in order to display privately the private information in the public video output through the shutters 9 of the active glasses 2.

Figure 2:
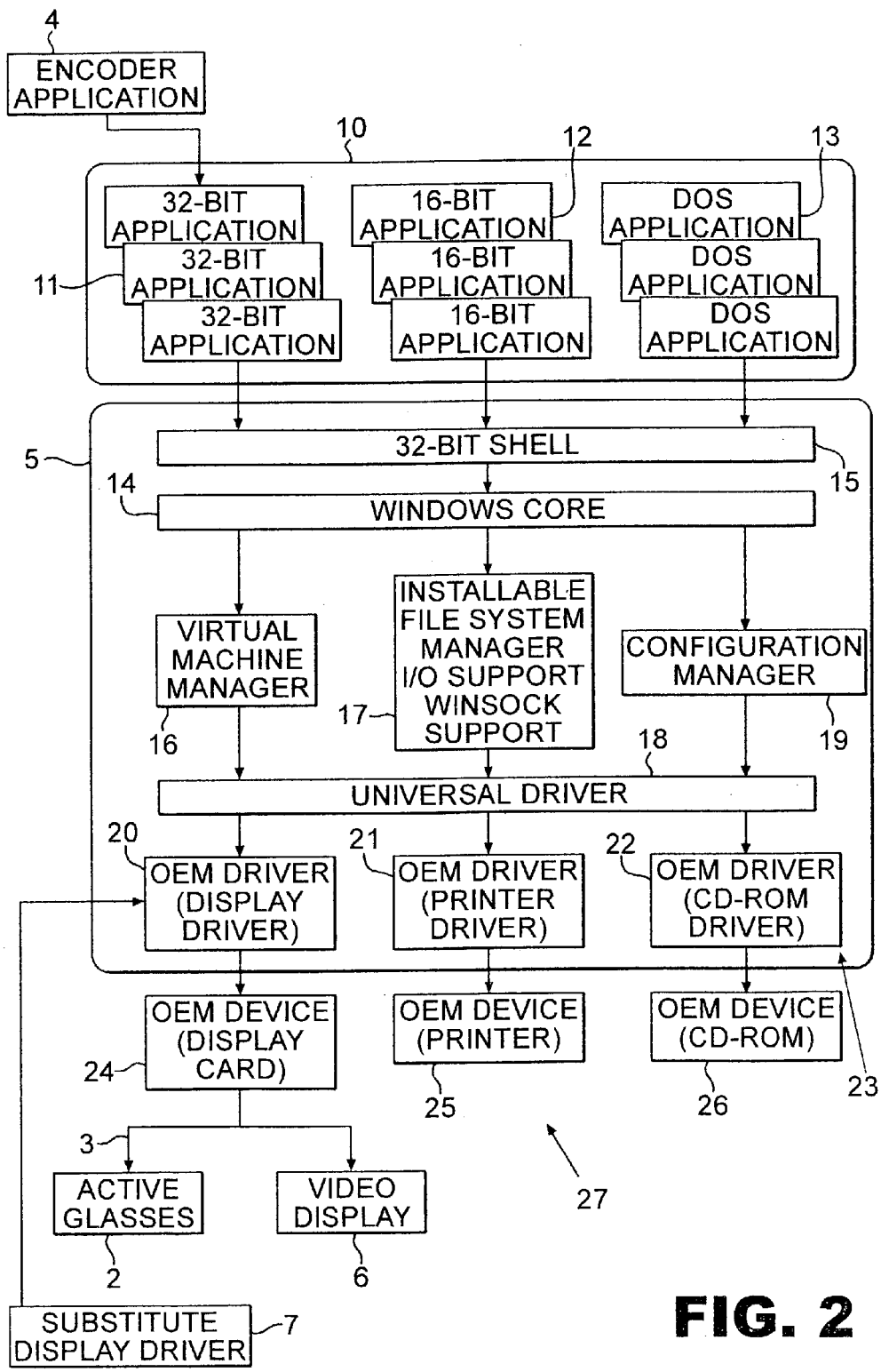
FIG. 2 is a schematic diagram of a computer software architecture modified for use with the present invention.

FIG. 2 is a schematic diagram of a typical windowing computer architecture and its internal operating system components, in accordance with the inventive arrangements. Notably, FIG. 2 indicates the architecture both prior and subsequent to modification by the inventive system. In FIG. 2, a typical computer architecture using the Microsoft Windows® system (manufactured by Microsoft Corporation of Redmond, Wash.) is shown as an example. One skilled in the art will recognize, however, that the invention is not limited in this regard. Rather, the present invention can be implemented in a similar manner using any operating system architecture having operative means for communication between the encoding software 4, the display 6 and active glasses 2.

In a typical windowing architecture, however, the display 6 and active glasses 2 are separated from the encoding software 4 residing in an applications program layer 10 by several device driver layers including a universal driver layer 18 and a specific device driver layer 23. Still, in one aspect of the present invention, the encoding software 4 can be included as part of a device driver within the specific device driver layer 23, as part of the universal driver layer 18, or as part of a presentation layer (not shown) of the operating system architecture. In this way, the display 6 and active glasses 2 can be driven by the operating system in a manner unnoticed by applications executing within the applications program layer 10. Rather, the display 6 and active glasses 2 can be driven as an inherent part of the operating system itself.

Generally, in the preferred architecture, applications programs 10, including 32 bit applications 11, 16-bit applications 12 and DOS applications 13, communicate with one another through an operating system shell layer 15 included as part of the operating system 5. Through the operating system shell layer 15, applications programs 10 can communicate with appropriate device drivers 23 through an additional universal driver layer 18 which can invoke a device specific device driver, for example a display driver 20, printer driver 21 or CD-ROM driver 22, to communicate with a specific attached device 27, for example display card 24, printer 25 or CD-ROM 26. Additionally, in the Windows95 operating system, windows core 14, virtual machine manager 16, installable file system manager and winsock support module 17 and configuration manager 19 can exist in between the 32-bit shell 15 and the universal driver 18.

Notwithstanding, the details of the internal Windows95 architecture are not pertinent to the present invention, except for the role of the operating system 5 as an intermediary between the application programs 10 and the device drivers 23. Specifically, using the Windows95 operating system, to pass a command to or receive data from a physical device 27, an applications program 10 preferably communicates with the physical device 27 through the operating system layer 5 and the specific device driver 23.

In FIG. 2, modifications and additions in accordance with the inventive arrangements are shown by the dashed-border boxes 2, 4 and 7. Specifically, FIG. 2 depicts a modified computer architecture incorporating an encoder applications program 4 and a substitute display driver 7. The substitute display driver 7 can replace the OEM display driver 20 in order to synchronously drive both the video display 6 and newly added active glasses 2. The encoder application, communicating with both the display 6 and active glasses 2 through the operating system 5 and substitute device driver 7, can synchronize the action of the shutters 9 (shown in FIG. 1) in the active glasses 2 with the presentation of images on the display 6 in order to provide the user with a private view of the video output shown in the display 6 while unauthorized users without the benefit of the synchronized active glasses 2 can view only the publicly viewable data.

Notably, though illustrated as part of the functionality of the substitute device driver 7, the synchronization of the active glasses 2 and the display 6 can be coordinated as part of the operating system itself and need not be included strictly as part of a third-party device driver. Alternatively, the synchronization of the active glasses 2 and the display 6 can be coordinated externally to the operating system and the device driver. In this embodiment, as the video signal of the private data is fed to the video display hardware, the publicly viewable data can be merged with the private data in accordance with the present invention and the active glasses 2 and display 6 can be driven accordingly.

Figure 3:
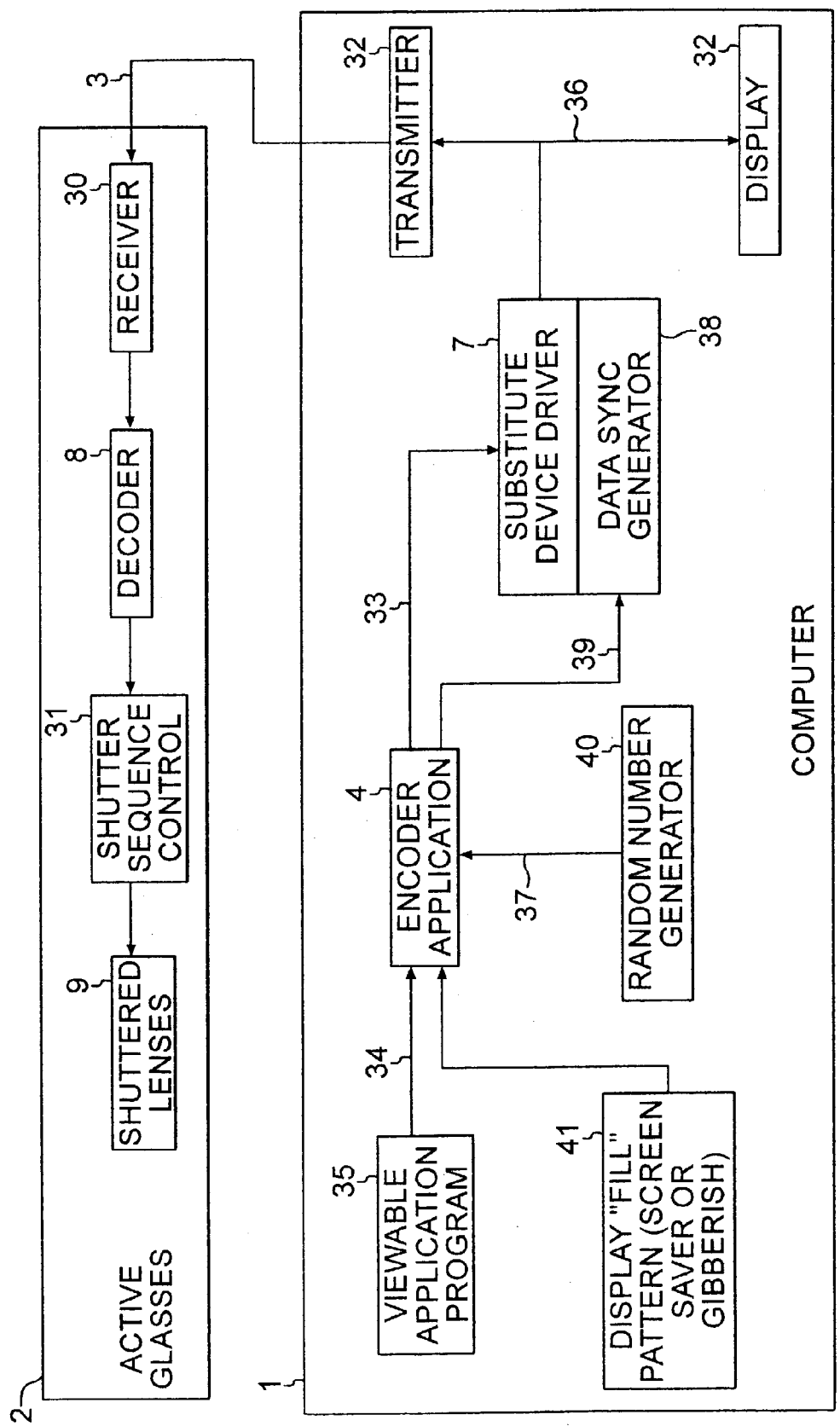
FIG. 3 is a schematic diagram illustrating the relationship between a computer and a pair of active glasses, both configured in accordance with the inventive arrangements.

In any case, the operation of the active glasses 2 in accordance with the inventive arrangements is shown diagramatically in FIG. 3. In the present invention, the active glasses 2 contain electro-optical elements typically found in active glasses, for example the shutters 9. Specifically, a shutter sequence control 31 can control the sequencing of the shutters 9. In addition, as discussed above, the active glasses 2 can include a decoder 8 for decoding encoded sequencing data transmitted by the computer 1 and received by the active glasses 2 in receiver 30 across data communications link 3.

In traditional 3D applications, each individual shutter can be opened and closed in an alternating manner. The only variable, if any, associated with the opening and closing of the shutters is the sequencing rate. In a preferred embodiment of the present invention, in addition to sequencing rate considerations, the decoder 8 can be used to synchronize the shutters of the active glasses 2 to a specific sequence pattern.

Subsequently, the opening and closing of the shutters 9 can be driven in a pattern that matches the pattern used to change the images in the display 6 attached to the computer 1.

In operation, the display 6 and the active glasses 2 are driven in synchronous operation by a specific pattern, creating in effect, a "strobe window" where only a portion of each character or graphic in the display 6 are displayed for one or the other of the user's eyes. At the next strobe, one or the other eye is presented with another portion of the character or graphic. After several strobes, a entire character or graphic in the display will have been reproduced. The number of strobes required can be dependent on the number of portions, or quadrants, per character used to develop an entire character on the display.

Figure 6A:
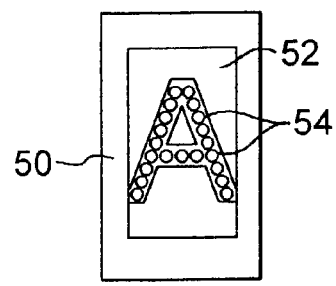
FIGS. 6A–6B, taken together, are illustrations of the formation and display of a character using strobing techniques.
Figure 6B:
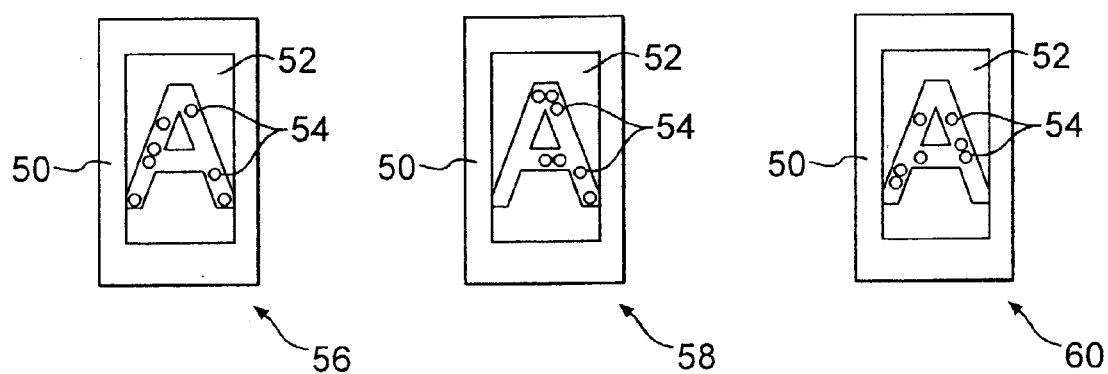

FIGS. 6A and 6B, taken together, illustrate an exemplary character formed using the above-described strobing technique. FIG. 6A illustrates a typical character display mechanism used in commercially available displays, well-known in the art. Each character in the display can be defined by a plurality of pixels 54 illuminated in a display. The pixels 54 are logically grouped into a character cell 50, and within that cell, a smaller character box 52. The intersections of the pixels 54 on an x—y axis of the character box 52 represent the possible locations of pixels 54 to illuminate for this character. Graphics can be described in the same manner, except the "boxes" are larger. In FIG. 6A, the character "A" is shown as it is "constructed" over the course of three "strobes" shown in FIG. 6B as described above. Notwithstanding, the pattern, as shown in FIG. 6B is merely an exemplary pattern. In fact, other combinations of pixels 54 could be chosen so long as a complete character can be formed subsequent to the completion of the sequencing pattern.

Advantageously, during each strobe, data unrelated to the private data can be displayed in the display screen 6 so that non-authorized users can observe only public data. For example, a screen-saver pattern can be employed as the unrelated public data. In particular, referring now to FIG. 3, the viewable application program 35 can provide standard video output 34 to the operating system 5 of FIG. 1, as it normally would in a computer 1 of FIG. 1, unmodified for the present invention. If enabled, the present invention can also generate a fill pattern 41 to create a public view for viewing by unauthorized viewers lacking the synchronized active glasses 2. Each of the standard video output 34 and the fill pattern 41 can be provided to the encoder application 4.

In order to synchronize the display 6 with the active glasses 2, the preferred embodiment can incorporate at least two sequencing patterns. One sequencing pattern simply opens or closes the shuttered lenses of the glasses 2 concurrently, and synchronously alternates the display between two different states. The first state can include the private data that the user wishes to view. The second image can include masking data, for example, a different screen, a screen saver, or the original image offset by some physical distance. For example, the image can be shifted one or more characters left or right, or shifted one or more lines up or down. If the screen is refreshed every 10 ms, the time between refresh points remains available for other sequences to be initiated so that other users on other machines in the same proximity can have their own private data views enabled. The latter method can prove useful for moderate levels of privacy and security.

A second sequencing pattern can include a specific combination of left eye/right eye images that can permit only the user to see each character on the screen. This second sequencing pattern can be more complex than the first sequencing pattern since the timing of the sequencing pattern and the sequencing of each left eye/right eye image can be variable. Nevertheless, in either case, without the specific sequencing information, the projected images will be unreadable to unauthorized users. Significantly, the projected images can be unreadable to unauthorized user having active glasses but lacking knowledge of the specific sequencing information.

In order to coordinate the specific sequencing of the display with the alternating action of the active glasses 2, the encoding application 4 can be employed. The encoding application 4, which implements a sequencing pattern encoding algorithm, preferably incorporates a random number as a seed for the encoding algorithm. The encoding algorithm can set the display device driver 7 and active glasses shutter sequence control 31 to a corresponding sequencing pattern. Advantageously, any popular encoding algorithm can be used in the sequencing pattern, so long as the algorithm can produce flicker-free operation.

Specifically, a set of guidelines exists for presenting different images in each eye while minimizing perceived flicker and eyestrain. Typical implementations employ a 120 Hz refresh rate, or as close to 120 Hz as possible according to the associated display's capability. However, because there are a number of monitors incapable of accommodating a 120 Hz refresh rate, a refresh rate adjustment utility can be provided to adjust and test the refresh rate setting whenever either a user selects a new resolution or connects a different display to the computer.

For example, at higher resolutions—i.e. 1024×768 and greater—a 100 Hz or 105 Hz refresh rate can accommodate a wide variety of displays that may not have a video bandwidth capable of coping with a 120 Hz refresh rate. Still, when the refresh rate falls below 120 Hz, the alternating pattern can become increasingly more noticeable. In particular, as the refresh rate falls below 90 Hz, flicker can become more apparent and may be problematic for some users. In contrast, for refresh rates above 90 Hz, flicker can be noticeable but not objectionable. Hence, refresh rates falling below 90 Hz preferably are avoided.

In order to properly synchronize the display 6 and the active glasses 2 in a secure manner, a random cycle time between strobe cycles can be chosen and inserted into the synchronization signal. In order to encode a synchronization signal with a random cycle time, the encoder application 4 can obtain a seed from random number generator 40 in order to create a random cycle time for use in synchronizing the display 6 and the active glasses 2. Specifically, as discussed in further detail herein, the seed can provide a foundation for delaying the display of privately viewable data in a subsequent strobe cycle, in between which the fill pattern will be inserted, and a public view therefore displayed.

The encoder 4 can generate a display signal 33 having the fill pattern 41 and interspersed therein according to the sequencing pattern of the synchronization signal, private data included in the standard video output 34. Concurrently, the encoder 4 can generate a data sync signal 39 for synchronizing the active glasses 2 with the display 6. The substitute device driver 7 can receive the display signal 33 while a data sync generator 38 can receive the data sync signal 39.

Initially, the substitute device driver 7, using the data sync generator 38, can initialize the active glasses 2 by transmitting through transmitter 32, an initialization sync signal (not shown) to the active glasses 2. Subsequently, the substitute device driver 7 can pass the data sync signal 39 to the active glasses 2 and the combined signal 33 to the display 6. By synchronizing the action of the shutters 9 using the data sync signal 39, the user can view only the portions of private data shown during the strobe (e.g. unmasked) cycles. The visual persistence of the user's eyes can integrate the strobed portions of private data into a unified, privately viewed image, secure from viewing by unauthorized users. Hence, the active glasses 2 can provide the user a private view of the data simultaneous to which an unauthorized viewer can see only the public pattern composed of the fill pattern 41 combined with the private view on the display 6.

Figure 4A:
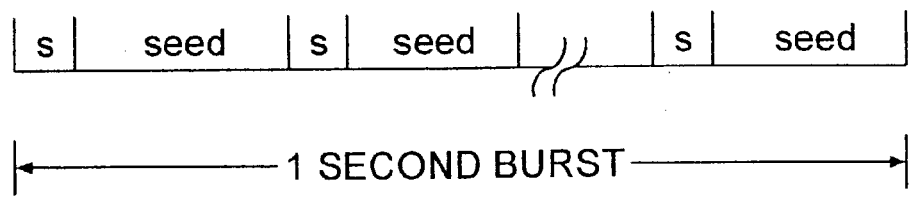
FIGS. 4A and 4B illustrate initialization synchronization and data transmission patterns used to synchronize the active glasses with a display of the computer.
Figure 4B:
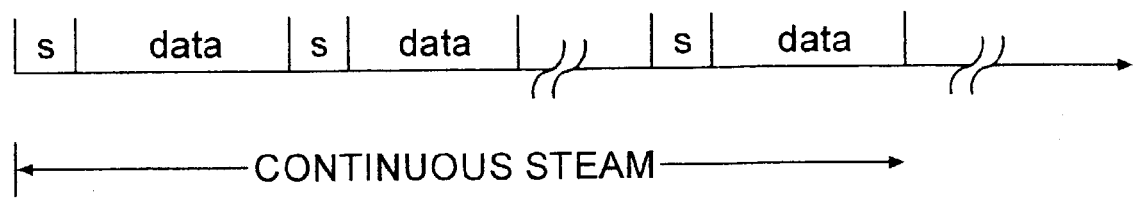

FIGS. 4A and 4B illustrate communications protocols which can be used for communications between the computer 1 and the active glasses 2. One skilled in the art will recognize however, that the protocols described herein are only exemplary of many protocols that could be equally and operatively employed. The important aspects of any protocol include the support for the initial synchronization of the computer 1 and active glasses 2 with the random seed, and the support for the transmission of the continuing synchronization between the computer 1 and the active glasses 2. Specifically, in the preferred embodiment, a user having a data communications link 3, preferably wireless, between the computer 1 and the active glasses 2 can turn away from the display 6, loose a communications connection across the data communications link 3, turn back to the display 6 and regain the communications connection. In addition, the continuing synchronization can eliminate the need for the active glasses 2 to maintain an accurate timer during the sequencing operation.

As shown in FIGS. 4A and 4B, the preferred embodiment can include two protocols, an initialization protocol and a data transmission protocol. As shown in FIG. 4A, the initialization protocol can initialize the active glasses 2 using the same seed used by the computer 1 to encode the shutter sequence in a data sync signal 39. Notably, as discussed above, the data sync signal 39 is merely an encoded shutter sequence and not the standard video output 34 which is combined with the fill pattern 41 and hidden on the display 6. The active glasses 2 can be initialized by a short burst, preferably one second or less, that transmits a data sync pattern for establishing communications between the computer 1 and the active glasses 2, and the seed pattern itself. Notably, as is well known in the art of data communications, the data sync pattern can be any pattern based on the error characteristics of the data communications link.

As shown in FIG. 4A, the initialization protocol preferably can be broadcast as a burst in order to prevent other proximate receivers from receiving and decoding the seed pattern. Still, the user preferably can add additional security by ensuring that no other active glasses in the area are being initialized at the same time. In the case of an infrared data communications link, the user can simply shield the transmitter and receiver path with the user's hand for the duration of the burst. Alternatively, in the case of an RF link, a serial number can be stored in a fixed memory in the active glasses 2. In consequence, the encoding application can use the serial number as part of the seed pattern so that only corresponding active glasses can decode the seed pattern.

FIG. 4B also illustrates a data transmission protocol. The data transmission protocol, like the initialization protocol, can include a broadcast of a data sync pattern and a data pattern. The data sync pattern may be the same or different than the initialization sync pattern. In fact, the data sync pattern can be eliminated if an encoding pattern, for example NRZ or NRZI, is used in the data communications link to denote timing data to be extracted by the active glasses. Still, since the data pattern is an encoded shutter synchronization pattern for the active glasses 2 to decode and apply, in incorporating a data sync pattern it is possible to further enhance security.

For example, notably each data pattern can differ so the shutter sequence can be continuously varied. The decoder 8 residing on the active glasses 2 simply can apply the new synchronization pattern, decoded in each data sync frame. Further security can be incorporated by varying the durations of each data sync frame. As a result, in broadcasting several synchronization patterns of differing length between each data sync, the active glasses decoder 8 can still extract the synchronization pattern as a continuous stream of left eye/right eye shutter actions.

Figure 5A:
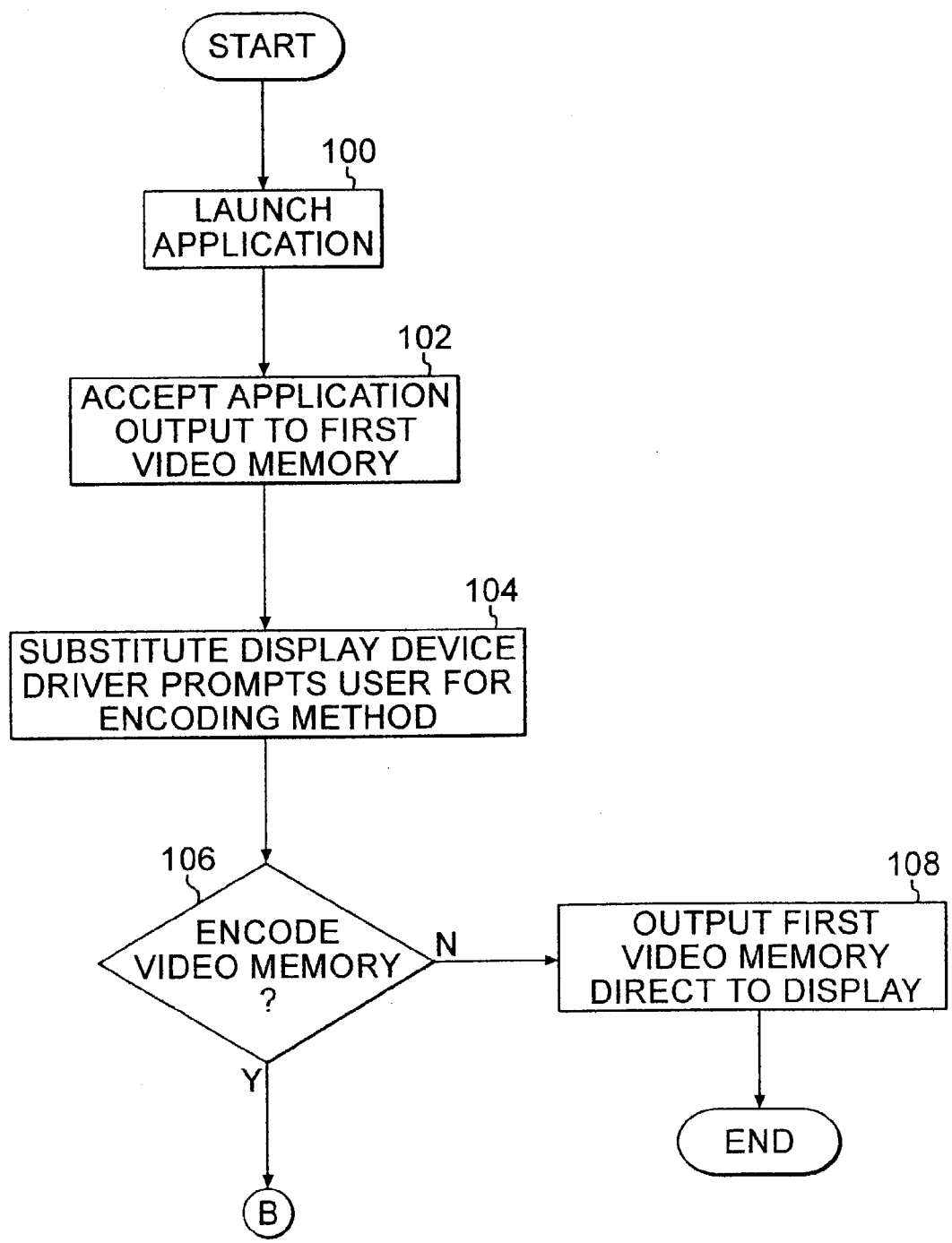
FIGS. 5A–5C, taken together, are flowcharts illustrating an inventive method for providing privately viewable data in a publicly viewable display.
Figure 5B:
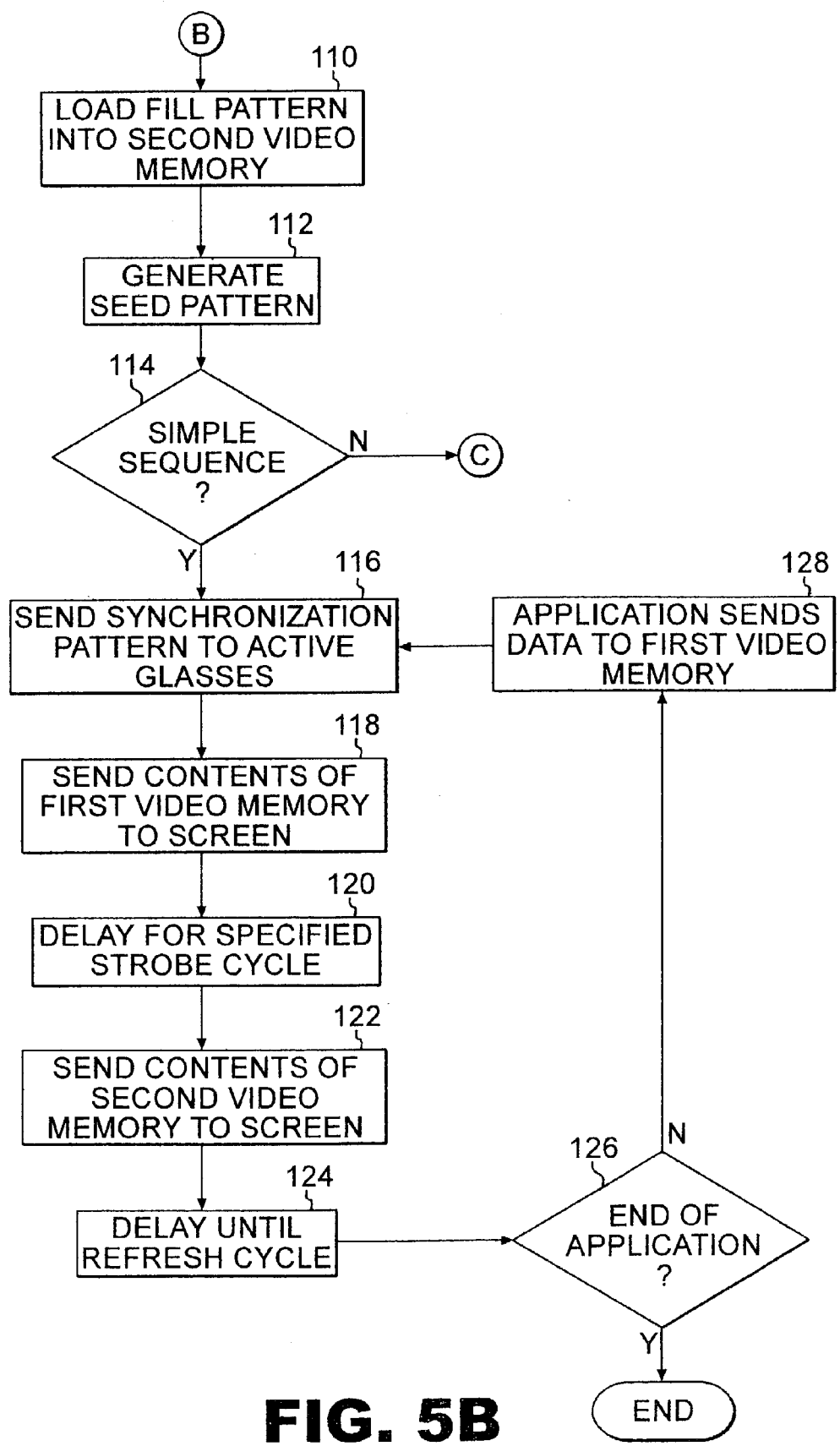
Figure 5C:
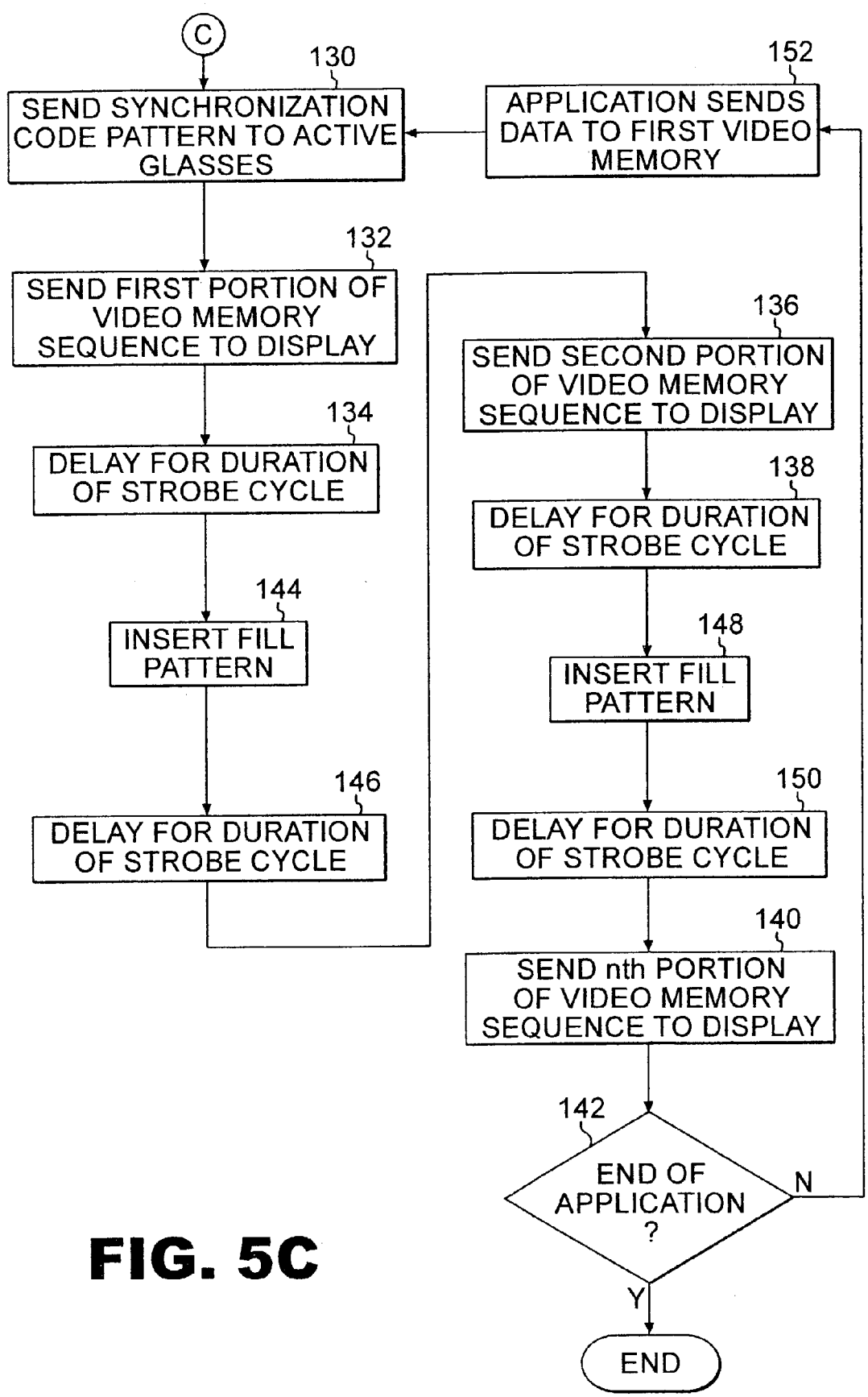

FIGS. 5A–5C, taken together, are flow charts illustrating a method for providing privately viewable data in a publicly viewable display. The method begins in step 100 during which an applications program residing in an applications layer of an operating system can be launched either automatically or manually by a user. In step 102, standard video output can be generated by the application and provided to the operating system for viewing on the display. Ultimately, the standard video output can be stored in a first video memory.

In step 104, the encoding application, or optionally, the substitute display driver—a replacement for a standard OEM display driver—receives notification of an attempt to provide video output to the display. In response, either the encoding application or, optionally the substitute display driver, prompts the user for an encoding method which can include simple sequencing, complex sequencing, or no sequencing at all. If the user chooses not to encode the video output, for instance where security is not of any particular concern, in step 108, the contents of the first video memory are output directly to the display as would normally occur in a computer system unmodified by the present inventive arrangements.

As shown in FIG. 5B, if the user chooses to encode the video output, for instance where security is of a particular concern, in step 110, a fill pattern can be loaded in a second video memory. Significantly, the fill pattern can include random data, or perhaps a screen saver image. Regardless, unauthorized viewers without active glasses synchronized in accordance with the inventive arrangements, in lieu of viewing private data, will view only the public pattern on the user's screen. Subsequently, in step 112, a seed pattern can be generated in order to determine a random cycle time for a data sync pattern.

In decision step 114, if the user has chosen a simple sequence pattern, in step 116, the synchronization pattern, generated using the random seed, can be transmitted to the active glasses so as to synchronize the action of the shuttered lenses with the strobing of the private data output to the display. Subsequently, in step 118, the contents of the first video memory can be output to the display. Following the output of the first video memory, a delay corresponding to the seed can be incurred in step 120. In step 122, in between the display of the private data, the contents of the second video memory—the fill pattern—can be transmitted to the display. Finally, in step 124, an additional delay can be incurred until the next refresh cycle of the display. The process can repeat with additional video output being provided by the application in step 128 until, in decision step 126, it is determined that the application has ended and, thus, has no further video output to be provided to the display. In this way, the user having the synchronized active glasses will view only the private data in the first video memory in accordance with the alternating action of the shuttered LCD projection display. Correspondingly, unauthorized viewers not having the synchronized active glasses will view only the public pattern composed of the fill pattern combined with the private view on the display. Notably, the private data is obscured by the fill pattern.

If in decision step 114, the user chooses to encode the video output using a complex sequence, as shown in FIG. 5C, in step 130, the synchronization pattern, generated using the random seed, can be transmitted to the active glasses so as to synchronize the action of the shuttered lenses with the strobing of the private data output to the display. Subsequently, in step 132, a first portion of the contents of the first video memory can be output to the display. Following the output of the first portion of the contents of the first video memory, a delay corresponding to the strobe cycle can be incurred in step 134. In step 144 a fill pattern can be output to the display. Subsequently, in step 146, a delay corresponding to the strobe cycle can be incurred.

In step 136, a second portion of the contents of the first video memory can be output to the display. Following the output of the second portion of the contents of the first video memory, an additional delay corresponding to the strobe cycle can be incurred in step 138. As in step 144, in step 148 a fill pattern can be output to the display. Subsequently, in step 150, a delay corresponding to the strobe cycle can be incurred. Additional portions of the contents of the first video memory can continue to be output to the display followed by corresponding delays and fill patterns. The process can continue for n portions of the contents of the video memory (not shown). Consequently, in step 140, the nth portion of the contents of the first video memory can be displayed.

The process can repeat with additional video output being provided by the application in step 152 until, in decision step 142, it is determined that the application has ended and, thus, has no further video output to be provided to the display. In this way, the user having the synchronized active glasses will view and integrate only the portions of private data in the first video memory in accordance with the alternating action of the shuttered lenses. Correspondingly, unauthorized viewers not having the synchronized active glasses will view only the public pattern while the private data is obscured by the fill pattern.

Figure 7:
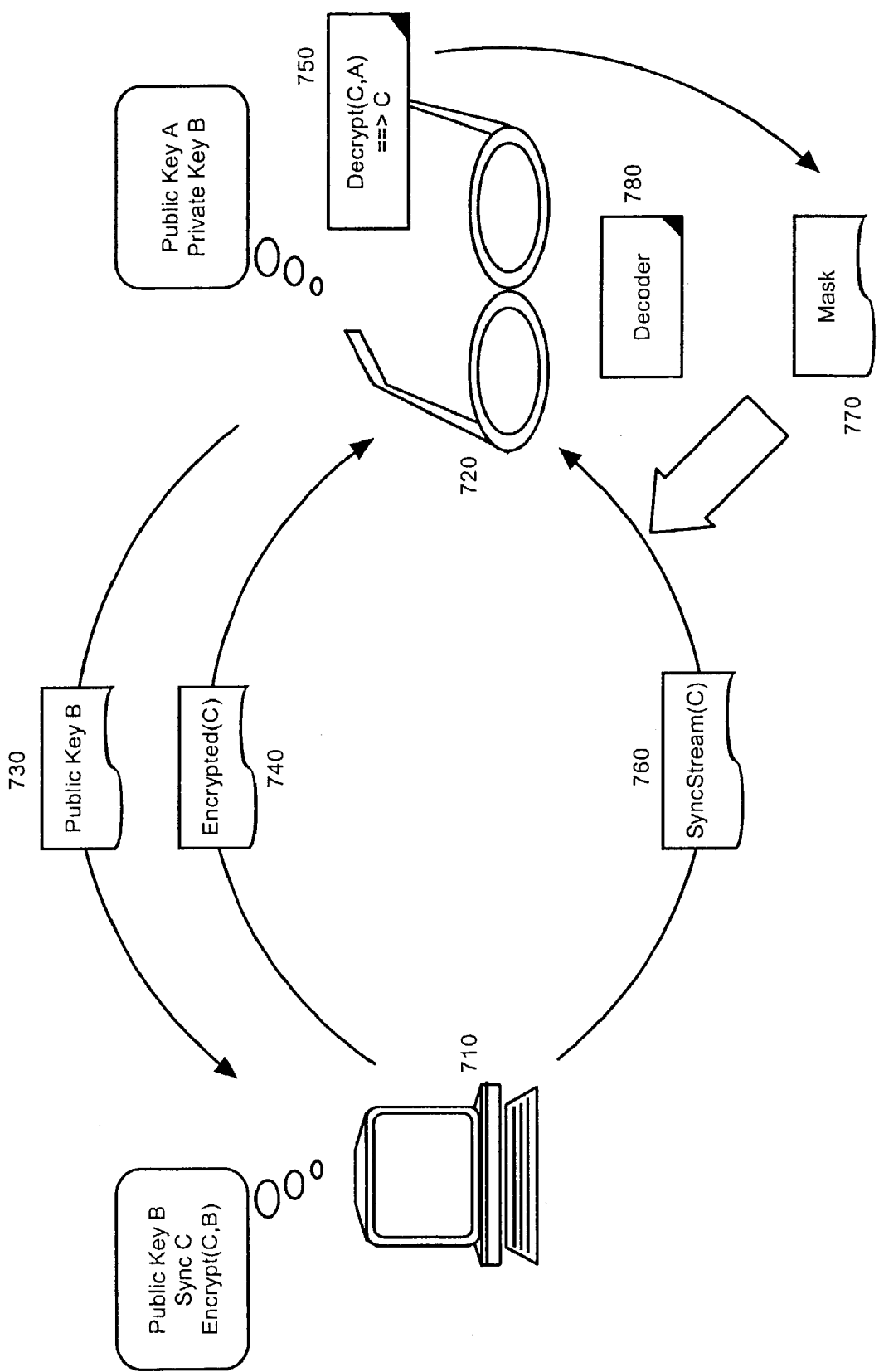
FIG. 7 is a diagramatic illustration of a secure method for providing privately viewable data in a publicly viewable display.

FIG. 7 is a diagramatic illustration of a secure method for providing privately viewable data in a publicly viewable display. Unlike the basic method of merely hiding data within a set of masking frames in accordance with an unsecured sequence, in the secure method of FIG. 7, the sequence itself can be encoded through the use of a mask, which can be specified dynamically and secretly so as to preserve the confidentiality of the mask itself. In this regard, a set of active glasses 720 and a display 710 can be communicatively coupled across either a wireless or wirebound medium. Initially, the active glasses 720 can generate an encryption key pair—one private and one public. Subsequently, the active glasses 720 can forward the public key 730 to the display 710.

Upon receipt, the display 710 can encrypt a proposed syncstream mask with the public key to produce an encrypted syncstream mask 740. Subsequently, the display 710 can forward the encrypted syncstream mask to the active glasses 720. Once the active glasses 720 have received the encrypted syncstream mask 740, the active glasses 720 can decrypt the encrypted syncstream mask 740 using the private key in a decryption process 750. Using the decrypted syncstream mask 770, the active glasses 720 can decode 780 subsequently received syncstream data 760 using the syncstream mask 770.

More particularly, the mask 770 can be applied against a single syncstream value to determine whether or not to activate the shutters. Alternatively, each bit of the syncstream can be evaluated against a corresponding bit in the mask to determine whether a particular pulse bit can activate the shutters of the active glasses 720. In either case, by first masking the syncstream and second, by encrypting the mask itself, a more secure mode of providing the privately viewable data in the publicly viewable display can be provided.

Figure 8:
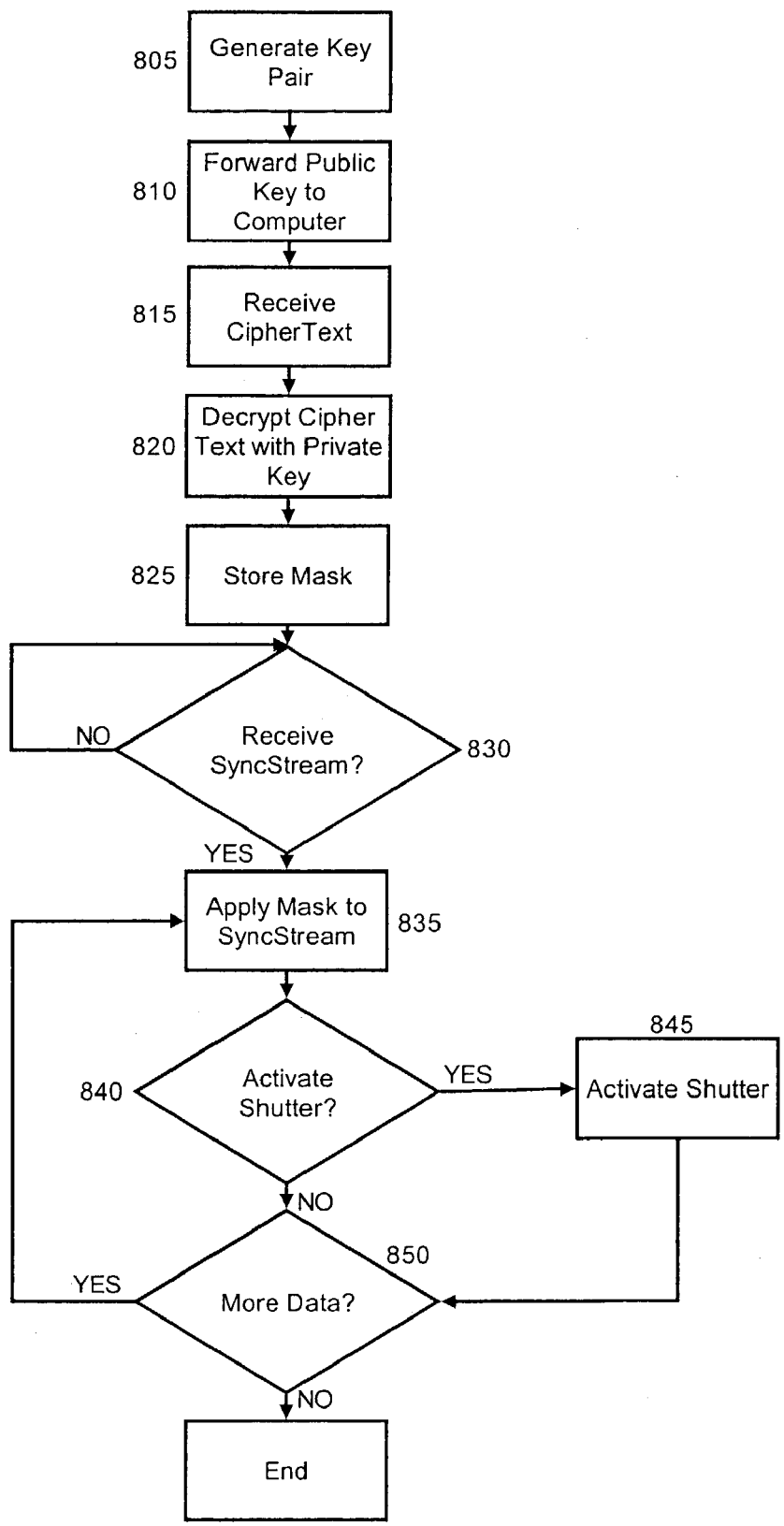
FIG. 8 is a flow chart illustrating a secure method for providing privately viewable data in a publicly viewable display.

FIG. 8 is a flow chart illustrating a secure method for providing privately viewable data in a publicly viewable display. Beginning in block 805, an asymmetric encryption key pair can be generated. In block 810, the public portion of the key pair can be forwarded to the computer associated with the display. In block 815, cipher text can be received from the computer, presumably containing an encrypted form of the syncstream mask. In block 820, the encrypted cipher text can be decrypted using the private portion of the key pair. Subsequently, in block 825 the decrypted mask can be stored for subsequent use.

In decision block 830, the active glasses can await the receipt of a syncstream instructing the active glasses when to open and close the shutters so as to view the private data interspersed among the public data frames in the display. Upon receiving the syncstream, in block 835 the stored mask can be applied against the syncstream to identify whether to activate the shutters of the active glasses. For instance, in applying the mask on a bit by bit basis to a syncstream of instructions to activate the shutters, high bits in the mask can confirm the activation of the shutters, while low bits can negate an instruction to activate the shutters. Of course, it will be recognized that the inverse can be true and the invention is not to be limited to the precise form of applying the mask on a bit by bit basis. As an alternative to a bit-by-bit application of the mask, the mask can be applied as a seed to generate a bit stream for determining whether to activate the shutters in the active glasses. As yet another alternative, the mask can be applied on a multi-bit basis where a set of bits in the mask and the syncstream can be combined and applied algorithmically.

In block 840, if the application of the mask to the syncstream indicates that the shutters should be activated, in block 845 the shutters can be activated. In either case, in decision block 850, if more data remains to be decoded using the mask, the process can return to block 835. Otherwise, the process can end.

Notably, the method illustrated in FIG. 8 is not limited to strictly applying the same mask to all syncstream data received from the display. Rather, in a more secure embodiment, new mask data can be periodically exchanged using new encryption key pairs so as to further decrease the likelihood that an unauthorized intruder can view the private data. While in a more secure methodology the mask can change for every syncstream, in a less processor intensive methodology, the mask can change periodically for every few syncstreams. In a yet further secure methodology, the mask can change on demand based upon a signal provided by the active glasses to the display, or by the display to the active glasses.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. A method for securely providing privately viewable data in a publicly viewable display comprising the steps of:
   generating an encryption key pair comprising a public key and a private key;
   encrypting a syncstream mask using said public key;
   forwarding said encrypted syncstream mask to a pair of active glasses;
   decrypting said encrypted syncstream mask with said private key;
   displaying private data frames interspersed among public data frames according to a sequencing pattern;
   encoding a syncstream based upon said syncstream mask, said syncstream specifying when to activate shutters in said active glasses in synchronization with said sequencing pattern; and,
   applying said decrypted syncstream mask to said encoded syncstream to determine when to activate said shutters in said active glasses,
   wherein said sequencing pattern is encoded through a use of the syncstream mask to preserve a confidentiality of the sequencing pattern.

2. The method of claim 1, wherein said applying step comprises the step of applying said decrypted syncstream mask to said encoded syncstream to compute a sequence specifying when to open and close said shutters in said active glasses in concert with said displaying of said private data frames.

3. The method of claim 1, wherein said applying step comprises the step of applying each bit in said syncstream mask to a corresponding bit in said encoded syncstream to determine whether to activate said shutters in said active glasses for said corresponding bit.

4. The method of claim 1, further comprising the step of repeating said generating, encrypting, forwarding and decrypting steps periodically.

5. A system for securely providing privately viewable data in a publicly viewable display through a plurality of proximately positioned active glasses, the system comprising:
   a transmitter/receiver coupled to the publicly viewable display configured to transmit syncstream data to the proximately positioned active glasses, and to receive commands and data from said proximately positioned active glasses;

a syncstream generator configured to produce a syncstream based upon a sequencing pattern defining when to display private data frames among a series of public data frames in the publicly viewable display;

a syncstream mask encoder coupled to said syncstream generator and configured to encode said syncstream based upon a syncstream mask; and, an encryption processor coupled to said syncstream mask encoder and configured to encrypt said syncstream mask for transmission to individual ones of the proximately positioned active glasses according to encryption key data provided by the individual ones of the proximately positioned active glasses through said transmitter/receiver, wherein said sequencing pattern is encoded through a use of the syncstream mask to preserve a confidentiality of the sequencing pattern.

6. The system of claim 5, wherein said encryption processor comprises an asymmetrical encryption processor configured to encrypt said syncstream mask according to public keys provided by said individual ones of said active glasses, wherein said encrypted syncstream mask can be decrypted according to private keys corresponding to said public keys.

7. The system of claim 5, wherein each of said transmitter/receiver, syncstream generator, syncstream mask encoder, and encryption processor are disposed in a pluggable display card.

8. The system of claim 5, wherein each of said transmitter/receiver, syncstream generator, syncstream mask encoder, and encryption processor are disposed within an operating system.

9. A method for securely providing privately viewable data in a publicly viewable display comprising the steps of:
generating an encryption key pair comprising a public key and a private key;
forwarding said private key to the publicly viewable display;
receiving an encrypted syncstream mask from the publicly viewable display and decrypting said received syncstream mask using said private key;
decoding subsequently received syncstream data with said decrypted syncstream mask; and,
activating shutters based upon said decoded syncstream data,
wherein the syncstream mask is configured to preserve a confidentiality of a sequencing pattern for activating said shutters.

10. The method of claim 9, wherein said decoding step comprises the step of applying said decrypted syncstream mask to said encoded syncstream to compute a sequence specifying when to open and close said shutters in said active glasses in concert with said displaying of said private data frames.

11. The method of claim 9, wherein said decoding step comprises the step of applying each bit in said decrypted syncstream mask to a corresponding bit in said received syncstream data to determine whether to activate said shutters for said corresponding bit.

12. The method of claim 9, further comprising the step of repeating said generating, forwarding and receiving steps periodically.

13. A machine readable storage having stored thereon a computer program for securely providing privately viewable data in a publicly viewable display, the computer program comprising a routine set of instructions for causing the machine to perform the steps of:
generating an encryption key pair comprising a public key and a private key;
forwarding said private key to the publicly viewable display;
receiving an encrypting syncstream mask from the publicly viewable display and decrypting said received syncstream mask using said private key;
decoding subsequently received syncstream data with said decrypted syncstream mask; and,
activating shutters based upon said decoded syncstream data,
wherein the syncstream mask is configured to preserve a confidentiality of a sequencing pattern for activating said shutters.

14. The machine readable storage of claim 13, wherein said decoding step comprises the step of applying said decrypted syncstream mask to said encoded syncstream to compute a sequence specifying when to open and close said shutters in said active glasses in concert with said displaying of said private data frames.

15. The machine readable storage of claim 13, wherein said decoding step comprises the step of applying each bit in said decrypted syncstream mask to a corresponding bit in said received syncstream data to determine whether to activate said shutters for said corresponding bit.

16. The machine readable storage of claim 13, further comprising the step of repeating said generating, forwarding and receiving steps periodically.

17. A method for securely providing privately viewable data in a publicly viewable display comprising the steps of:
receiving from a pair of active glasses a private key associated with an encryption key pair comprising a public key and a private key;
encrypting a syncstream mask with said private key and transmitting the encrypted syncstream mask to said active glasses;
interspersing private data frames among a set of public data frames according to a sequencing pattern;
computing a syncstream based upon said sequencing pattern and encoding said syncstream based upon said syncstream mask;
transmitting said encoded syncstream to said active glasses; and,
displaying said data frames in the publicly viewable display,
wherein said sequencing pattern is encoded through a use of the syncstream mask to preserve a confidentiality of the sequencing pattern.

18. A machine readable storage having stored thereon a computer program for securely providing privately viewable data in a publicly viewable display, the computer program comprising a routine set of instructions for causing the machine to perform the steps of:
receiving from a pair of active glasses a private key associated with an encryption key pair comprising a public key and a private key;
encrypting a syncstream mask with said private key and transmitting the encrypted syncstream mask to said active glasses;

interspersing private data frames among a set of public data frames according to a sequencing pattern;

computing a syncstream based upon said sequencing pattern and encoding said syncstream based upon said syncstream mask;

transmitting said encoded syncstream to said active glasses; and, displaying said data frames in the publicly viewable display, wherein said sequencing pattern is encoded through a use of the syncstream mask to preserve a confidentiality of the sequencing pattern.

* * * * *